(12) United States Patent
Huang

(10) Patent No.: US 6,389,938 B1
(45) Date of Patent: May 21, 2002

(54) CNC (COMPUTER NUMERAL CONTROLLED) COMPOSITE TOOL HOLDER

(75) Inventor: Ming-Ho Huang, Taichung (TW)

(73) Assignee: Victor Taichung Machinery Works Co., Ltd. (TW)

( * ) Notice: Subject to any disclaimer, the term of this patent is extended or adjusted under 35 U.S.C. 154(b) by 0 days.

(21) Appl. No.: 09/567,317

(22) Filed: May 9, 2000

(51) Int. Cl.$^7$ .............................. B23B 5/04; B23B 7/00
(52) U.S. Cl. .............................. 82/112; 82/118; 82/158
(58) Field of Search .......................... 82/118, 112, 113, 82/120, 121, 133, 134, 158, 159, 56, 95, 100

(56) References Cited

U.S. PATENT DOCUMENTS

| | | | | |
|---|---|---|---|---|
| 4,327,612 A | * | 5/1982 | Bazuin | 82/120 |
| 4,854,199 A | * | 8/1989 | Norman | 82/112 |
| 5,664,470 A | * | 9/1997 | Garnett et al. | 82/121 |
| 5,765,457 A | * | 6/1998 | Meyer et al. | 82/112 |
| 5,921,159 A | * | 7/1999 | Watkins | 82/159 |

* cited by examiner

Primary Examiner—Henry Tsai
(74) Attorney, Agent, or Firm—Jackson Walker L.L.P.

(57) ABSTRACT

A CNC (computer numeral controlled) composite tool holder has a body, an outer cover, a spindle, a cutter headstock, a control rod, a cutter bracket, a control cylinder and parts used to fit the cutter bracket onto the cutter headstock. The outer cover covers the body that holds the driving parts. The spindle is mounted in the body. The cutter headstock has a central hole to allow the spindle to pass through the cutter headstock. The control rod is slidably positioned in the spindle. The cutter bracket is mounted on the cutter headstock and has two lathe tools. The control cylinder is mounted in the outer cover and connected to the spindle. With the two lathe tools, an article can be cut on two faces at the same time.

15 Claims, 5 Drawing Sheets

CNC (COMPUTER NUMERAL CONTROLLED) COMPOSITE TOOL HOLDER

BACKGROUND OF THE INVENTION

1. Field of the Invention

The present invention relates to a composite tool holder, and particularly, to a CNC (computer numeral controlled) composite tool holder capable of simultaneously operating two lathe tools.

2. Description of Related Art

With reference to FIG. 5, the conventional CNC tool holder essentially contains a body (50), an spindle (60) fit in the body (50), a cutter headstock (70) mounted on the spindle (60) and parts to connect the cutter headstock (70) to the spindle (60).

The body (50) is mounted on a CNC tool holder (not shown) at the base (52) and has an outer cover (54) over the driving parts mounted in the body (50).

The spindle (60) is rotatably mounted in the body (50) and has a threaded end (63) and several longitudinal ribs (62) defined along the spindle (60).

The cutter headstock (70) comprises a central hole (71), a circular recesses (72), multiple lathe tool receivers (73), a boring tool cylinder (75) and a boring tool holder (76). The spindle (60) is pressed into the central hole (71). The circular recesses (72) is defined around the central hole (71). The multiple lathe tool receivers (73) are defined on one face of the cutter headstock (70), and each receiver (73) having an angular shunting recess (732) defined on one end. A locking piece (742) can further be used to lock the lathe tool in the lathe tool recess (73). The boring tool cylinder (75) is mounted on the outside edge of the cutter headstock (70), and the boring tool holder (76) is received in the boring tool cylinder (75).

The parts used to mount the cutter headstock (70) to the spindle (60) including a control block (64), a pair of spindle connecting pieces (65, 66), an O-ring (682), a gasket (68) and an outer cover (77). The control block (64) is clamped between the pair of spindle connecting pieces (65, 66). The O-ring (682) is located between the spindle-connecting piece (65) and the body (50). The gasket (68) is located between the spindle connecting piece (66) and the cutter headstock (70). The outer cover (77) is mounted in the recess (72) in the outer face of the cutter headstock (70) to cover, in sequence from outside to inside, a washer (674), a lock washer (672) and a nut (67). Each one of these parts, except the outer cover (77), has a central hole to allow the spidle (60) to pass through and the nut (67) has a inner thread to screw onto the threaded end (63) of the spindle (60). The outer cover (77) also has an inner theread to screw onto the threaded end (63) of the spindle (63).

However, with this conventional CNC tool holder, tools can only be mounted on one side of the tool headstock. Therefore, if an article needs to be cut on two sides, the article must be cut on one side. Then the cutter must be stopped to change to change the position of the article so the other side of the article can be cut. Therefore, it is very inconvenient to operate the conventional CNC tool holder when an article needs to be cut on two faces.

In view of the foregoing, a CNC (computer numeral controlled) composite tool holder capable of simultaneously operating two lathe tools is desired.

SUMMARY OF THE INVENTION

The objective of the present invention is to provide a CNC (computer numeral controlled) composite tool holder capable of simultaneously operating two lathe tools.

To achieve the objective, the CNC (computer numeral controlled) composite tool holder in accordance with the present invention essentially comprises a body, an outer cover, a spindle, a cutter headstock, a control rod, a cutter bracket, a control cylinder and parts used to fit the cutter bracket onto the cutter headstock. The outer cover covers the body that receives the driving parts. The spindle is mounted in the body. The cutter headstock has a central hole to allow the spindle to protrude through the cutter headstock. The control rod slidably fit into the spindle. The cutter bracket is mounted on the cutter headstock and has two lathe tools. The control cylinder is mounted in the outer cover and connected to the spindle. With the two lathe tools, an article can be simultaneously cut on two faces.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
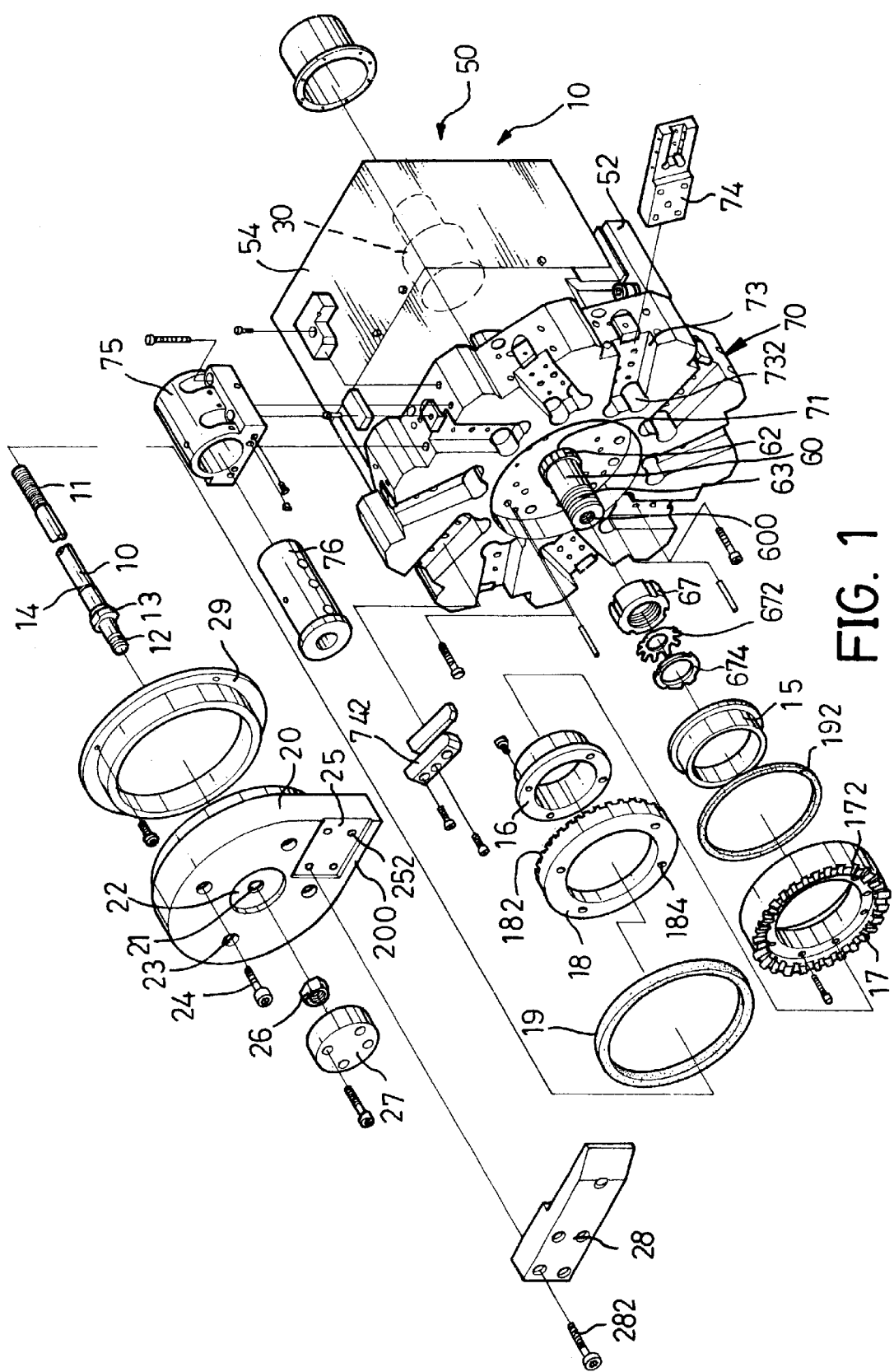
FIG. 1 is an exploded perspective view for the CNC composite tool holder in accordance with the present invention.
Figure 2:
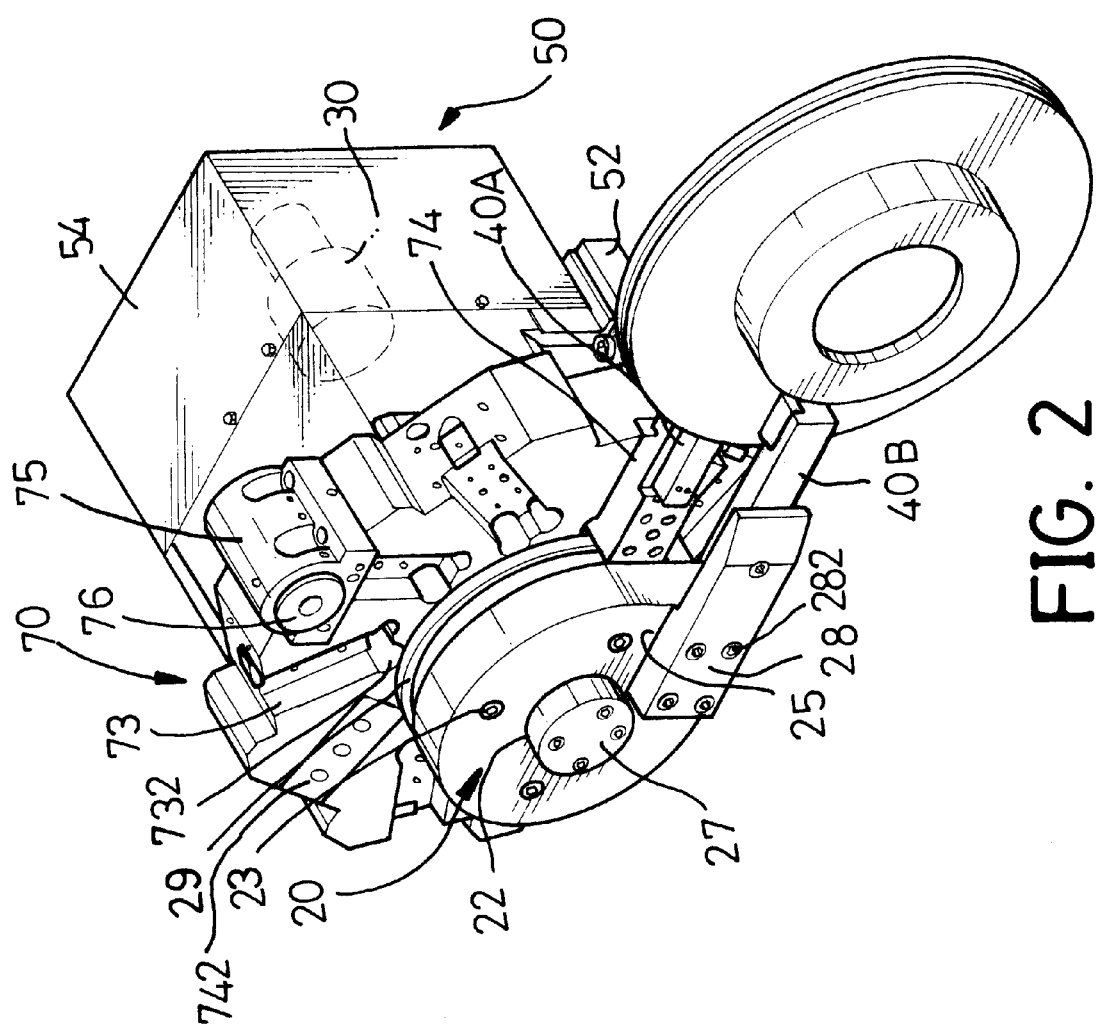
FIG. 2 is a perspective view of the CNC composite tool holder in FIG. 1.
Figure 3:
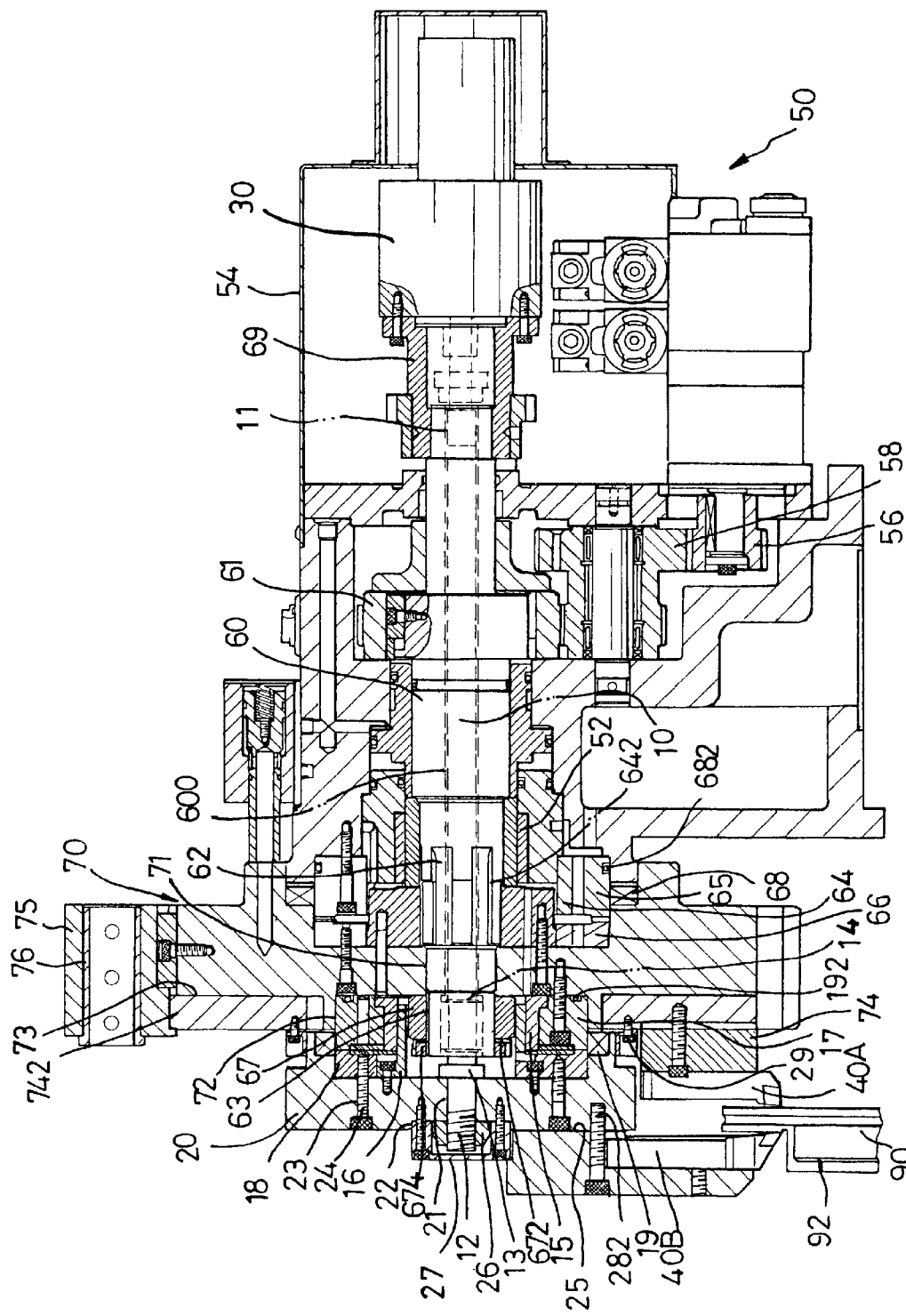
FIG. 3 is a side plane view in partial section of the CNC composite tool holder in FIG. 1.

With reference to FIGS. 1, 2 and 3, the CNC composite tool holder in accordance with the present invention essentially comprises a body (50), an outer cover (54), a spindle (60), a cutter headstock (70), a control rod (10), a cutter bracket (20), a control cylinder (30), and parts used to fit the cutter bracket (20) onto the cutter headstock (70).

The body (50), the outer cover (54) together with the driving parts received inside and the cutter headstock (70) are conventional configured, so that they will not be discussed in detail in the specification. Generally, the parts used to connect the headstock (70) to the control rod (10) comprise, in sequence from outside to inside, a washer (674), a lock washer (672) and a nut (67). In short, the outer cover (54) is mounted on one end of the body (50) at the base (52) to cover the body (50) and to receive the driving parts, and the cutter headstock (70) has a central hole to allow the spindle (60) to pass through; and a teeth ring (61) for driving the spindle (60) is further provided to fixedle mounted on the spindle (60).

The spindle (60) in accordance with the present invention further has a threaded central hole (600) defined in the protruding end. Mulitiple longitudinal ribs (62) and a threaded end (63) are further defined on the exterior of the spindel (60), and the control cylinder (30) is fit to the interior end of the spindle (60) through a positioning tube (69) (see FIG. 3).

The control rod (10) is slidably fit into the spindle (60) in the central hole (600). The control rod (10) has exterior threads on both ends (11, 12), an eccentric locking flange (13) defined near the exterior threaded end (12) and a groove (14) defined between the interior threaded end (11) and the locking flange (13). The interior threaded end (11) can pass through the central hole (600) of the spindle (60) to screw into the control cylinder (30), such that the control cylinder (30) can control the movement of the control rod (10). The groove (14) is defined to receive a seal ring (not shown). The parts used to connect the headstock (70) to the control rod (10) comprise, in sequence from outside to inside, a washer (674), a lock washer (672) and a nut (67).

In addition, the locking flange (13) on the control rod (10) is used to lock a collar (16) and a self-lubricating bearing (15) together, which are both received in a circular recess (72) in the exterior face of the cutter headstock (70), such that two spindle connectors (17, 18) each with a circular series of teeth (172, 182) facing each other can be engaged with each other. The spindle connector (18) further has several threaded holes (184) defined around the central hole. A gasket (19) is mounted on the outside of the two spindle connectors (17, 18) at the outer edge of the circular recess (72). An O-ring (192) is mounted between the spindle connector (17) and the circular recess (72).

The cutter bracket (20) is disk shaped with a central hole (21) defined to allow the control rod (10) to pass so a nut (26) can be screwed on the exterior threaded end (12) of the control rod (10). A circular recess (22) is define around the central hole (21) of the cutter bracket (20). Multiple positioning holes (23) are defined through the cutter bracket (20) to corrsepond to the threaded holes (184) in the spindle connector (18), such that when the control rod (10) pass through the central hole (21) of the cutter bracket (20), bolts (24) are pass through the positioning holes (23) to screw into the threaded holes (184) in the spindle connector (18), resulting in the nut (26) and the locking flange (13) fixedly forcing the cutter bracket (20) onto the cutter headstock (70). Furthermore, an outer cover (27) is mounted in the recess (22) of the cutter bracket (20). Additionally, the cutter headstock (70) further comprises a central hole (71), multiple lathe tool receivers (73), a boring tool cylinder (75) and a boring tool holder (76). The spindle (60) is pressed into the central hole (71). The circular recesses (72) is defined around the central hole (71). The multiple lathe tool receivers (73) are defined on one face of the cutter headstock (70), and each receiver (73) has an angular shunting recess (732) defined on one end. The boring tool dylinder (75) is mounted on the outside edge of the cutter headstock (70), and the boring tool holder (76) is received in the boring tool cylinder (75).

Additionally, at least one protrusion (200) integrally extends from the cutter bracket (20) to align with one of the lathe tool receivers (73) in the cutter headstock (70). A limiting recess (25) is defined in each protrusion (200) to allow a cutter holding piece (28) to be fixedly mounted in the recess (25) on the protrusion (200). The recess (25) has multiple threaded holes (252) and the cutter holding piece (28) has multiple through holes respectively corresponding to the threaded holes (252) in the recess (25). Thus, a second lathe tool (40B) can be mounted on the limiting recess (25) by the cutter holding piece (28) and faces a first lathe tool (40A) mounted on the corresponding one of the lathe tool receivers (73) by a locking piece (742). With the two lathe tools (40A, 40B), an article can be cut on two faces at the same time.

Additionally, the cutter bracket (20) further has a locking collar (29) mounted on the side of the cutter bracket (20) facing the cutter headstock (70). The locking collar (29) is used to move the cutter bracket (20) and to adjust the gap between the first and the second lathe tool (40A, 40B).

Figure 4:
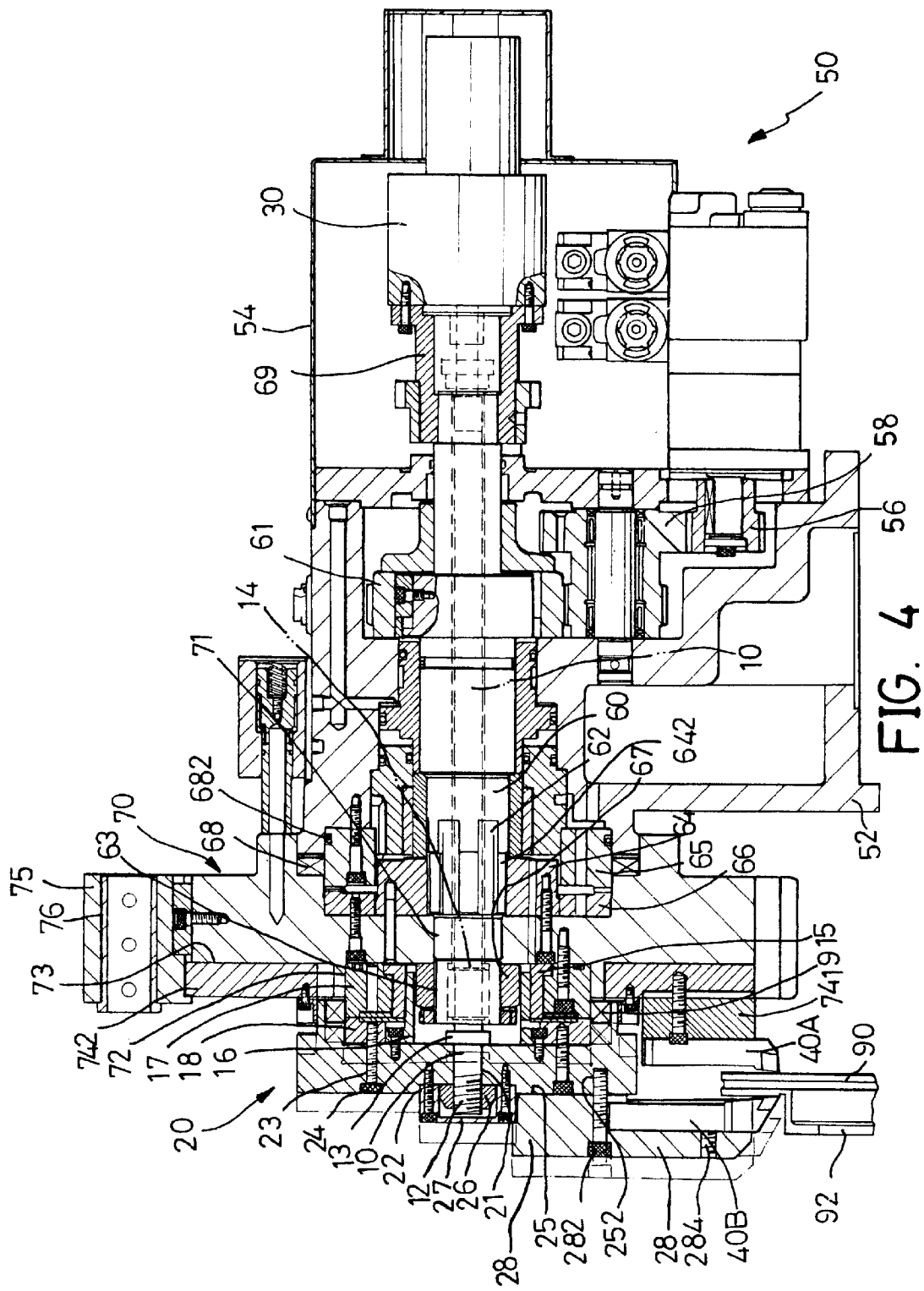
FIG. 4 is an operational side plane view in partial section of the CNC composite tool holder in FIG. 1.
Figure 5:
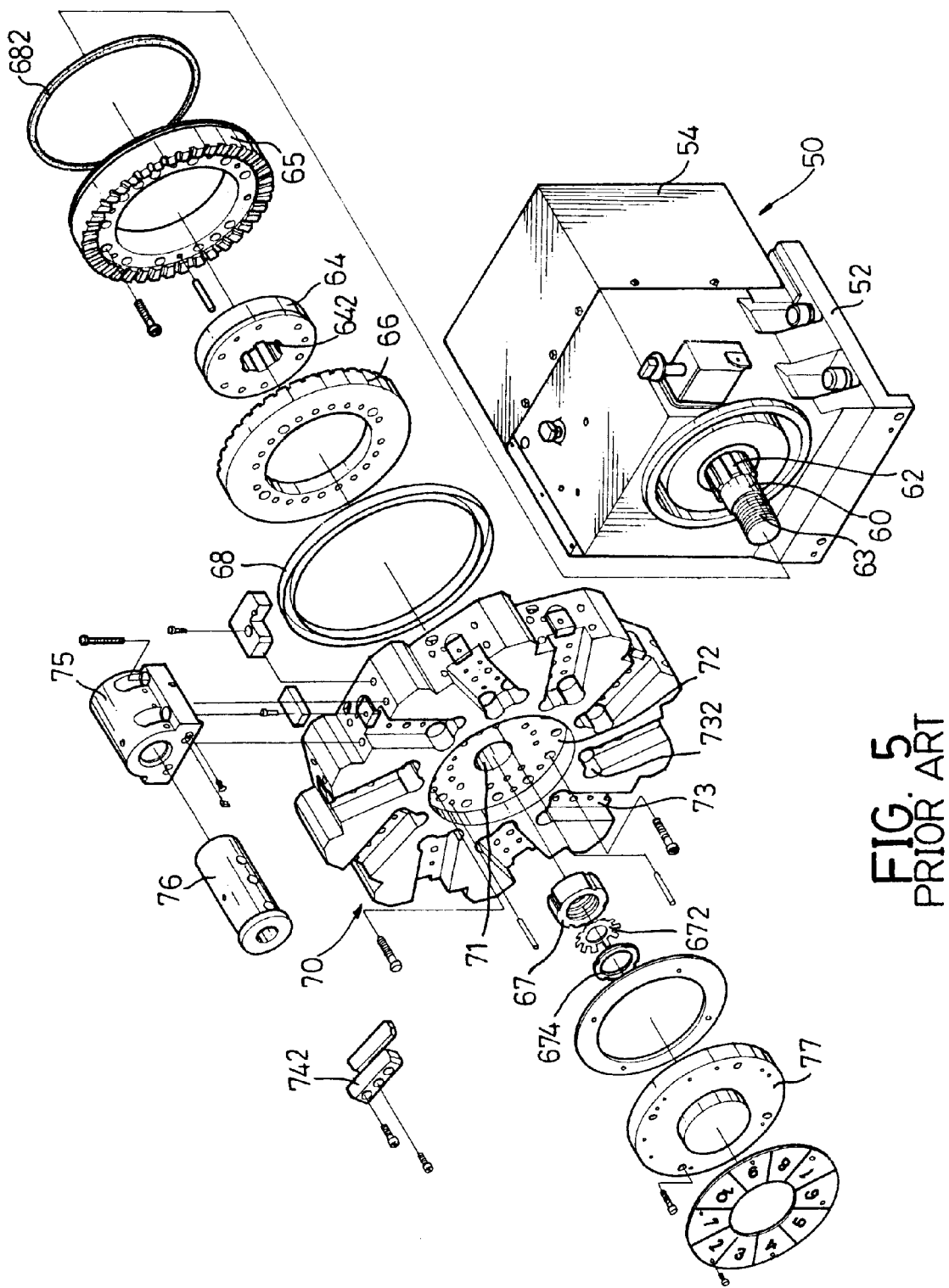
FIG. 5 is an exploded perspective view of the conventional tool holder in accordance with the prior art.

With reference to FIGS. 3 and 4, when an article, such as a brake disk (90) needs to be cut on both sides, a suitable lathe tool bracket (74) can be selected to cut the brake disk (90). Then, the control cylinder (30) can adjust the movement of the control rod (10) to cause the cutter bracket (20) to precisely abut the face of the cutter headstock (70). Consequently, a suitable gap is formed between the first and the second lathe tools (40A, 40B) and that a positioning piece (92) of the brake disk (90) can be hold by the holding parts of the CNC composite tool holder. Thus, the cutting of the brake (90) can be controlled by the computer, and, after cutting, the control rod (10) can be moved by the control cylinder (30) to allow the cut brake (90) to release from the CNC composite tool holder such that the operation of the cutting to an article that needs to be cut both sides at the same time will be very fast and convenient.

Although the present invention has been explained in relation to its preferred embodiment, it is to be understood that many other possible modifications and variations can be made without departing from the spirit and scope of the invention as hereinafter claimed.

What is claimed is:

1. A CNC (computer numeral controlled) composite tool holder comprising:

a body;

an outer cover covering the body;

driving parts received in the cover;

a spindle rotatably mounted in the body and with both ends extending through the body;

a cutter headstock having a central hole to allow the spindle to extend therethrough and to be rotatably mounted in the body;

at least one first lathe tool mounted on the cutter headstock;

a control rod slidably and rotatably mounted in the spindle;

a cutter bracket mounted on the cutter headstock;

a control cylinder mounted in the outer cover and connected to one end of the control rod by way of the spindle to control the sliding of the control rod; and a second lathe tool attached to the cutter bracket with a distance to one of the at least one first lathe tool mounted on the cutter headstock being adjustable by the control rod, wherein a circular recess is define around a central hole in the cutter bracket and multiple positioning holes are defined on the cutter bracket to corrsepond to threaded holes in a spindle connector; and when the control rod passes through the central hole in the cutter bracket, bolts pass through the positioning holes to screw into the threaded holes in the spindle connector, resulting in the nut and the locking flange fixedly forcing the cutter bracket onto the cutter headstock.

2. The CNC composite tool holder as claimed in claim 1, wherein the spindle has a central hole defined in an exterior endthereof to allow the control rod to pass through.

3. The CNC composite tool holder as claimed in claim 1, wherein the spindle has mulitiple longitudinal ribs defined thereon to lock the cutter headstock and a threaded exterior end defined on an outer periphery of the spindle to allow a nut to screw thereonto.

4. The CNC composite tool holder as claimed in claim 1, wherein the control cylinder is fit to an interior end of the spindle passing through a positioning tube.

5. The CNC composite tool holder as claimed in claim 1, wherein the control rod has an interior threaded end screwed onto the control cylinder and an exterior threaded end, a locking flange defined near the exterior threaded ends, a groove defined between the interior threaded end, a nut screwed onto the locking flange with the exterior threaded end to lock the bracket, and the groove defined to receive a seal ring.

6. The CNC composite tool holder as claimed in claim 5, wherein the interior threaded end passes through a central hole of the spindle to screw into the control cylinder.

7. The CNC composite tool holder as claimed in claim 5, wherein the locking flange on the control rod is used to lock a collar and a self-lubricating bearing both received in a circular recess in the cutter headstock.

8. The CNC composite tool holder as claimed in claim 1, wherein the control rod has two spindle connectors each with a circular series of teeth facing each other so that the teeth can be engaged to each other.

9. The CNC composite tool holder as claimed in claim 8, wherein the spindle connector further has multiple threaded holes defined around a central hole thereof.

10. The CNC composite tool holder as claimed in claim 8, wherein a gasket is further mounted on an outside face of the spindle connector to be flush with the edge of the circular recess.

11. The CNC composite tool holder as claimed in claim 1, wherein the cutter bracket is a disk having a central hole defined thereon to allow the control rod to pass through and a nut is provided to be screwed on an exterior threaded end of the control rod.

12. The CNC composite tool holder as claimed in claim 1, wherein an outer cover is further mounted in the recess in the cutter bracket to cover the threaded end of the control rod.

13. The CNC composite tool holder as claimed in claim 1, wherein a protrusion integrally extends from the cutter bracket to align with a lathe tool receiver to receive one of the at least one first lathe tools in the cutter headstock; and a limiting recess is defined in the protrusion to allow a cutter holding piece to be fixedly mounted thereon.

14. The CNC composite tool holder as claimed in claim 13, wherein the recess in the protrusion has multiple threaded holes and the cutter holding piece has multiple through holes corresponding to the threaded holes in the recess, such that the second lathe tool can be mounted on the limiting recess and be fixedly locked in place by a bolt between the cutter holding piece and the limiting recess so that the second lathe tool faces the corresponding one of the at least one first lathe tools.

15. The CNC composite tool holder as claimed in claim 14, wherein the cutter bracket further has a locking collar mounted on a side of the cutter bracket facing the cutter headstock to move the cutter bracket to a position when in need.

* * * * *